United States Patent

Fetterman et al.

[11] Patent Number: 5,178,074
[45] Date of Patent: Jan. 12, 1993

[54] RAILWAY GONDOLA CAR

[75] Inventors: Donald B. Fetterman, Arlington; Stephen W. Smith, Dallas, both of Tex.

[73] Assignee: Trinity Industries, Inc., Dallas, Tex.

[21] Appl. No.: 795,495

[22] Filed: Nov. 21, 1991

[51] Int. Cl.$^5$ ............................................. B61D 7/00
[52] U.S. Cl. .................... 105/406.1; 105/404; 105/355
[58] Field of Search ............ 105/238.1, 247, 244, 105/245, 246, 404, 250, 251, 252, 254, 355, 256, 358, 359, 360, 406.1, 406.2

[56] References Cited

U.S. PATENT DOCUMENTS

| | | | |
|---|---|---|---|
| 45,834 | 1/1865 | Keeler | 105/249 |
| 719,868 | 2/1903 | Randal | 105/247 |
| 1,054,087 | 2/1913 | Campbell | 105/247 |
| 1,069,763 | 8/1913 | Campbell | 105/247 |
| 1,412,660 | 4/1922 | Kuehner | 105/406.1 |
| 1,434,517 | 11/1922 | Wingert | 105/247 |
| 1,627,256 | 5/1927 | Smith | 105/249 |
| 3,376,832 | 4/1968 | Flowers | 105/406.1 |
| 3,474,740 | 10/1969 | Varnes | 105/360 |
| 3,713,400 | 1/1973 | Teoli | 105/406.1 |
| 3,964,399 | 6/1976 | Miller et al. | 105/406.1 |
| 4,212,252 | 7/1980 | Hart et al. | 105/406.1 |
| 4,254,714 | 3/1981 | Heap | 105/406.1 |
| 4,361,097 | 11/1982 | Jones et al. | 105/406.1 |
| 4,617,868 | 10/1986 | Wahlstrom et al. | 105/247 |
| 4,637,320 | 1/1987 | Paton et al. | 105/406.1 |

FOREIGN PATENT DOCUMENTS 0812966  12/1958  France .................. 105/358

Primary Examiner—Robert J. Oberleitner
Assistant Examiner—Mark T. Le
Attorney, Agent, or Firm—Baker & Botts

[57] ABSTRACT

A rotary dump gondola railway car that includes troughs which extend angularly from the centerline of the car toward the trucks and thereby lower the center of gravity of the car, increase the capacity of the car, or provide the same capacity with lowered overall height, thereby reducing the wind resistance or drag of the car and providing more efficient operation.

20 Claims, 1 Drawing Sheet

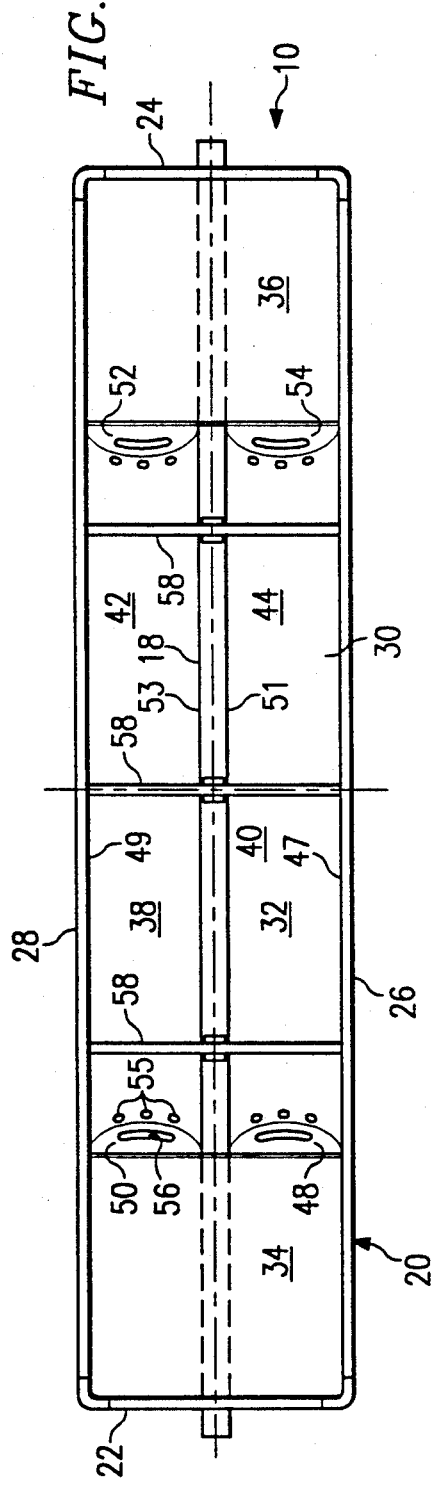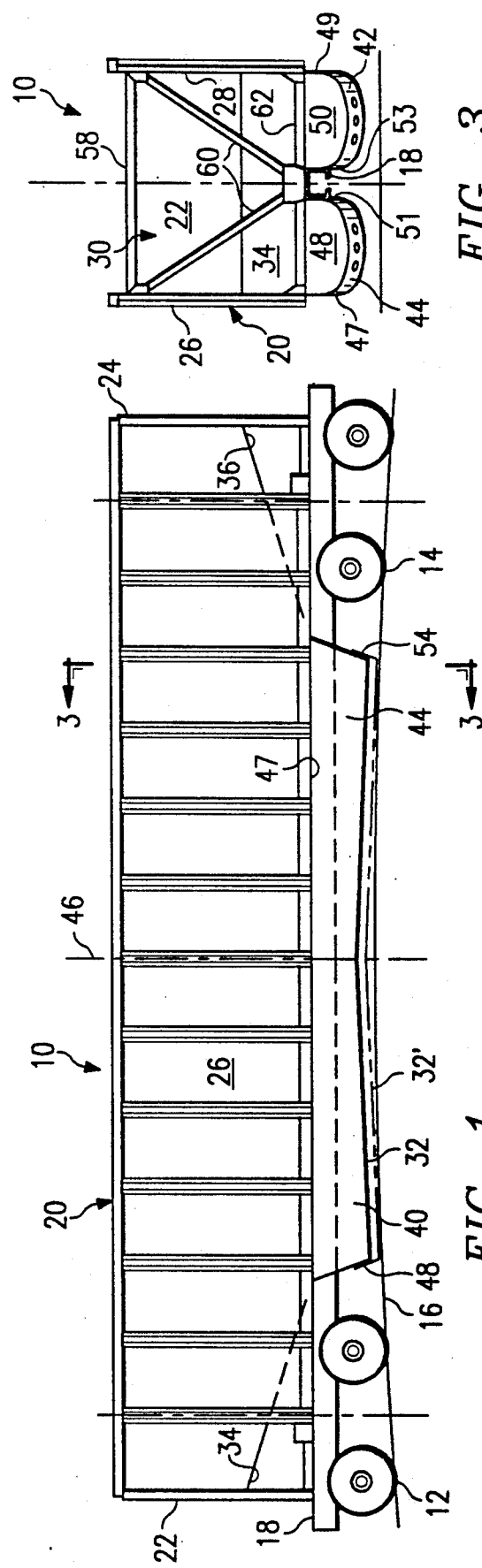

RAILWAY GONDOLA CAR

TECHNICAL FIELD OF THE INVENTION

This invention relates generally to a railway car of the gondola type that is commonly used for carrying bulk materials. More particularly, and not by way of limitation, this invention relates to an improved gondola car which is loaded through an open top and unloaded by inverting the entire car.

BACKGROUND OF THE INVENTION

Currently, some gondola cars of the rotary dump type are constructed to include a depressed center section to lower the center of gravity of the car and to provide increased capacity for the car. One such car is described in U.S. Pat. No. 3,713,400 to Teoli.

A more recent patent on a rotary dump gondola car is U.S. Pat. No. 4,361,097 issued to Jones, et al. on Nov. 30, 1982. The gondola car of the '097 patent includes a depressed center portion that is constructed of two parallel extending concave troughs that are disposed between the trucks supporting the car. The car has enjoyed a reasonable amount of success because of the increased capacity and the lower center of gravity provided by the structure described in the patent.

This invention provides an improved gondola car of the rotary dump type that includes a pair of troughs that extend between the trucks supporting the railway car and are disposed along each side of a center sill that extends the full length of the car. The troughs of the car of this invention, contrary to those illustrated in the '097 patent are deeper adjacent to the trucks than at the latitudinal center line of the car. The ability to make the troughs deeper near the trucks provides a greater capacity car having a lower center of gravity or, on the other hand, provides a car having the same capacity with a lower overall height to reduce the drag effect from the wind as the car is being pulled along the tracks.

SUMMARY OF THE INVENTION

In one aspect, this invention provides an improved bottom structure for a rotary dump, gondola railway car wherein the bottom structure includes a pair of troughs that extend along the longitudinal axis of the car between the trucks and that extend at an angle from the highest point, relative to the tracks, adjacent to the center line of the car to the lowest point, relative to the tracks, adjacent to the trucks.

In another aspect, this invention provides an improved rotary dump gondola railway car that includes a longitudinally extending center sill, trucks supporting each end of the center sill, a hollow gondola body supported by the center sill, sides and a bottom structure that includes a pair of troughs extending downwardly at an angle from near the latitudinal center line of the car toward the trucks.

BRIEF DESCRIPTION OF THE DRAWINGS

The foregoing and additional objects and advantages of the invention will become more apparent as the following detailed description is read in conjunction with the accompanying drawing wherein like reference characters denote like parts in all views and wherein:

FIG. 1 is a side elevation view of a rotary dump gondola car that is constructed in accordance with the invention;

FIG. 2 is a top plan view of the rotary gondola car of FIG. 1; and

FIG. 3 is a cross sectional view of the rotary dump gondola car of FIG. 1 taken generally along the line 3—3 of FIG. 1.

DETAILED DESCRIPTION OF THE PREFERRED EMBODIMENT

Referring to the drawing and to FIG. 1 in particular, shown therein and generally designated by the reference character 10 is a rotary dump gondola railway car. The railway car 10 includes front and rear trucks 12 and 14 that support the car 10 for movement along tracks 16. Mounted on the trucks 12 and 14 is a center sill 18 that extends longitudinally through the car 10. The center sill 18 is pivotally connected to the trucks 12 and 14 by means (not shown) that is well understood in the railway car art.

The car 10 also includes a gondola body 20 that includes front and rear ends 22 and 24 and left and right sides 26 and 28. As may be seen better in FIGS. 2 and 3, the body 20 also includes an open top 30.

The gondola body 20 also includes a bottom 32. The bottom 32 is comprised of a front sloping portion 34 and a rear sloping portion 36. Each of the sloping portions 34 and 36 extend from a respective end of the car downwardly toward the mid portion of the car between the trucks 12 and 14.

The bottom 32 also includes four generally concave troughs 38, 40, 42 and 44 (see also FIG. 2). Each of the troughs 38, 40, 42 and 44 have higher or first ends located adjacent to a latitudinal centerline 46 of the car 10. The first ends of the troughs 38, 40, 42 and 44 are connected at the centerline 46. Lower or second ends of the troughs are located adjacent to the trucks 12 and 14.

The lower ends of the troughs are provided with an end closure member 48, 50, 52 or 54, which are themselves disposed at an angle relative to the vertical. The lower ends of the troughs are located closer to the track 16 than are the first ends of the troughs. The increased angle between the troughs and the end closures is to help eliminate build-up of bulk materials at the ends of the troughs, thus improving the rotary dumping operations. It will be noted that each of the troughs extends downwardly at an angle from the higher ends thereof toward the lower ends.

Outside edges 47 and 49 of each of the troughs is connected, such as by fasteners, to the lower edge of one of the sides 26 or 28. Generally, a structural member such as a side sill (not shown) may be located between the edges 47 and 49 and the side walls 26 or 28. Similarly, inside edges 51 and 53 on the troughs are connected to the center sill 18.

The angular disposition of the troughs relatively closely fits the vertical curvature of the track 16 as is clearly shown in FIG. 1. As illustrated, the track 16 is intentionally drawn along the minimum vertical curve required by the Association of American Railroads for this type of car. The curve, by regulation, must have a minimum radius of 300'. As illustrated in the solid lines, the troughs are in the position that they occupy when the car is unloaded. Due to spring deflection in the loaded car, the bottom of the troughs is indicated by a dash line 32' which is the loaded position of the bottom of the troughs. It will be noted that the line 32' indicating the loaded position of the troughs does not touch the vertical curve as shown by the track 16.

As may be seen most clearly in FIG. 3, the bottoms of each of the troughs are provided with a plurality of drainage holes 55. Preferably, at least one of the holes 55 is located at the lowest point in the troughs adjacent to the second or lower ends of the troughs. Also, and as may be seen most clearly in FIG. 2, each of the end members is provided with a drainage hole 56 which is preferably located adjacent to the lowest point of the troughs. The holes 55 and 56 may be removably covered (not shown) if desired so that the holes may be opened and closed when desired. However, it is important that the holes be located at the lowest point to prevent the deleterious effects of water or chemicals that may enter the car and stand therein in the absence of the holes 55 and 56.

To add structural stability to the gondola body 20, there is provided a plurality of spaced cross members 58 that extend between the upper edges of the sides 26 and 28 and a plurality of spaced diagonal braces 60 that extend from the sides 26 and 28 to the center sill 18. Stability for the lower part of the body 20 is provided by cross members 62.

With prior art cars, the troughs are located parallel so that the distance across the bottom of the car is a constant distance. By providing the angularly disposed troughs which generally fit the vertical curve, the portions of the troughs adjacent to the trucks can be located closer to the track 16. The result is that the center of gravity of the car is lowered, providing a more stable car when loaded.

Also, it should be pointed out that the capacity of the car can be increased by the lowering of the portion of the troughs or, in the alternative, the top of the car can be lowered providing a car with less wind resistance. With less wind resistance, of course, the car can be operated more efficiently since it takes less fuel to pull the car over the tracks.

As will be appreciated from the foregoing detailed description, a car constructed in accordance with the invention provides for the lowering of the center of gravity and for greater capacity compared to prior art cars. In the alternative, the car may have a lower center of gravity while maintaining the same capacity with a lower overall height which provides for less wind resistance and more efficient operation.

The foregoing detailed description has been presented by way of example only and many changes and modifications can be made thereto without departing from the spirit of the invention.

What is claimed is:

1. A railway gondola car including trucks for moveably supporting the car on railway tracks, comprising:
   a center sill extending longitudinally of the car between said trucks;
   a gondola body including front and rear walls, side walls and a bottom;
   said bottom including a pair of generally concave troughs, one of said pair being located on each side of said center sill and extending between said trucks, each said trough extending at a downward angle from a first end toward a second end; and
   said first ends being located near the midpoint of the car between the trucks and said second ends being located proximate said trucks.

2. The gondola car of claim 1 wherein said bottom includes end members connected to and closing the second ends of the troughs.

3. The gondola car of claim 2 wherein at least one drain opening is provided in said end members adjacent to the second ends of said troughs.

4. The gondola car of claim 1 wherein each of said troughs has at least one hole formed adjacent to said second ends.

5. The gondola car of claim 1 wherein said bottom also includes:
   outer edges on said troughs connected to said side walls; and
   inner edges on said troughs connected to said center sill.

6. The gondola car of claim 1 wherein the angle of each said trough is at least sufficient to accommodate a vertical curve having a 300 foot radius without said troughs interfering with any portion of said curve.

7. The gondola car of claim 5 wherein said bottom includes end members connected to and closing the second ends of the troughs.

8. The gondola car of claim 7 wherein at least one drain opening is provided in said end members adjacent to the second ends of said troughs.

9. The gondola car of claim 5 wherein each of said troughs has at least one hole formed adjacent to said second ends.

10. The gondola car of claim 7 wherein each of said troughs has at least one hole formed adjacent to said second ends.

11. A railway gondola car including trucks for moveably supporting the front and rear of the car on railway tracks, comprising:
    a center sill extending longitudinally of said car, between said trucks;
    a gondola body including front and rear walls, side walls and a bottom;
    said bottom projecting downwardly on each side of said center sill forming left and right bottom portions, each said portion having an outer edge connected to said side wall and having an inner edge connected to said center sill, and each extending downwardly at an angle from a high point, relative to said tracks, located about the mid-point of said car between said trucks to a low point relative to said tracks, located proximate said trucks, defining an angular bottom surface providing clearance between said bottom surface and a vertical track curve while providing maximum volume and a low car center of gravity.

12. The gondola car of claim 11 including end members in said bottom portions having at least one drain opening provided in said end members adjacent to the low points of said bottom portions.

13. The gondola car of claim 11 wherein each of said bottom portions has at least one hole formed adjacent to said low points.

14. The gondola car of claim 11 wherein the angle of said bottom portions is at least sufficient to accommodate a vertical curve having a 300 foot radius without said troughs interfering with any portion of said curve.

15. A bottom for a railway gondola car having a full length center sill that extends between trucks for supporting the car on railway tracks, said bottom comprising:
    four generally concave bottom members tapering from a first end to a relatively deep second end;
    said first ends being arranged for location near the midpoint of the car between the trucks;

said second ends being arranged for location proximate said trucks; and end members connected to and closing the second ends of said bottom members.

16. The gondola car bottom of claim 15 wherein at least one drain opening is provided in said end members adjacent to the second ends of said bottom members.

17. The gondola car bottom of claim 15 wherein said bottom also includes:

outer edges on said bottom members connected to side walls of the railway gondola car; and inner edges on said bottom members connected to said center sill.

18. The gondola car bottom of claim 15 wherein the taper of said bottom member is at least sufficient to accommodate a vertical curve having a 300 foot radius without said bottom members interfering with any portion of said curve.

19. The gondola car bottom of claim 16 wherein the taper of said bottom members is at least sufficient to accommodate a vertical curve having a 300 foot radius without said bottom members interfering with any portion of said curve.

20. The gondola car bottom of claim 17 wherein the angle of said bottom member is at least sufficient to accommodate a vertical curve having a 300 foot radius without said bottom members interfering with any portion of said curve.

* * * * *